(12) United States Patent
Hsu

(10) Patent No.: US 6,975,506 B2
(45) Date of Patent: Dec. 13, 2005

(54) ELECTRONIC APPARATUS AND INPUT DEVICE WITH MOVABLE SUPPORT DEVICE

(75) Inventor: Chien-Shih Hsu, Taipei (TW)

(73) Assignee: Darfon Electronics Corp., Taoyuan (TW)

( * ) Notice: Subject to any disclaimer, the term of this patent is extended or adjusted under 35 U.S.C. 154(b) by 0 days.

(21) Appl. No.: 10/838,547

(22) Filed: May 4, 2004

(65) Prior Publication Data

US 2004/0223296 A1 Nov. 11, 2004

(30) Foreign Application Priority Data

May 5, 2003 (TW) .............................. 92208164 U

(51) Int. Cl.[7] .............................................. G06F 1/16
(52) U.S. Cl. ........................ 361/680; 400/682; 345/168
(58) Field of Search ................................ 361/679, 680, 361/683; 345/168; 16/357, 360, 361; 248/188.1, 248/346.01; 341/22; 348/169–172; 235/145; 400/472–496, 400/682, 680; 312/223.2, 327, 328

(56) References Cited

U.S. PATENT DOCUMENTS

| 6,053,589 | A | * | 4/2000 | Lin | 312/271 |
| 6,561,708 | B2 | * | 5/2003 | Lin | 400/495 |
| 6,585,440 | B2 | * | 7/2003 | Lin | 400/681 |
| 6,614,649 | B1 | * | 9/2003 | Wang | 361/680 |
| 6,632,037 | B2 | * | 10/2003 | Lin et al. | 400/472 |
| 6,714,403 | B2 | * | 3/2004 | Furuki et al. | 361/680 |
| 6,755,581 | B1 | * | 6/2004 | Huang et al. | 400/472 |
| 6,773,179 | B2 | * | 8/2004 | Huang et al. | 400/472 |
| 2002/0101405 | A1 | * | 8/2002 | Chang | 345/168 |
| 2002/0122028 | A1 | * | 9/2002 | Wang | 345/168 |
| 2004/0104897 | A1 | * | 6/2004 | Mochizuki et al. | 345/168 |
| 2004/0190230 | A1 | * | 9/2004 | Mochizuki et al. | 361/600 |
| 2004/0223296 | A1 | * | 11/2004 | Hsu | 361/680 |
| 2004/0228668 | A1 | * | 11/2004 | Hsu | 400/472 |

FOREIGN PATENT DOCUMENTS

JP 2004-185230 * 7/2004 .............. G06F 3/02

* cited by examiner

Primary Examiner—Anatoly Vortman
Assistant Examiner—Zachary Pape
(74) Attorney, Agent, or Firm—Snell & Wilmer L.L.P.

(57) ABSTRACT

An electronic apparatus with a movable support device is provided. The electronic apparatus, such as an input device, includes a housing and a support device. The housing includes a first part and a second part. The first part is pivotally coupled to the second part so that the housing is selectively in a first configuration and a second configuration. The support device has two connection portions, which are coupled to the first part and the second part of the housing respectively. When the housing is in the first configuration, the support device is accommodated within the housing. When the housing is in the second configuration, in response to movement of the first and second parts of the housing, the support device moves to a predetermined position for supporting an electronic device.

19 Claims, 10 Drawing Sheets

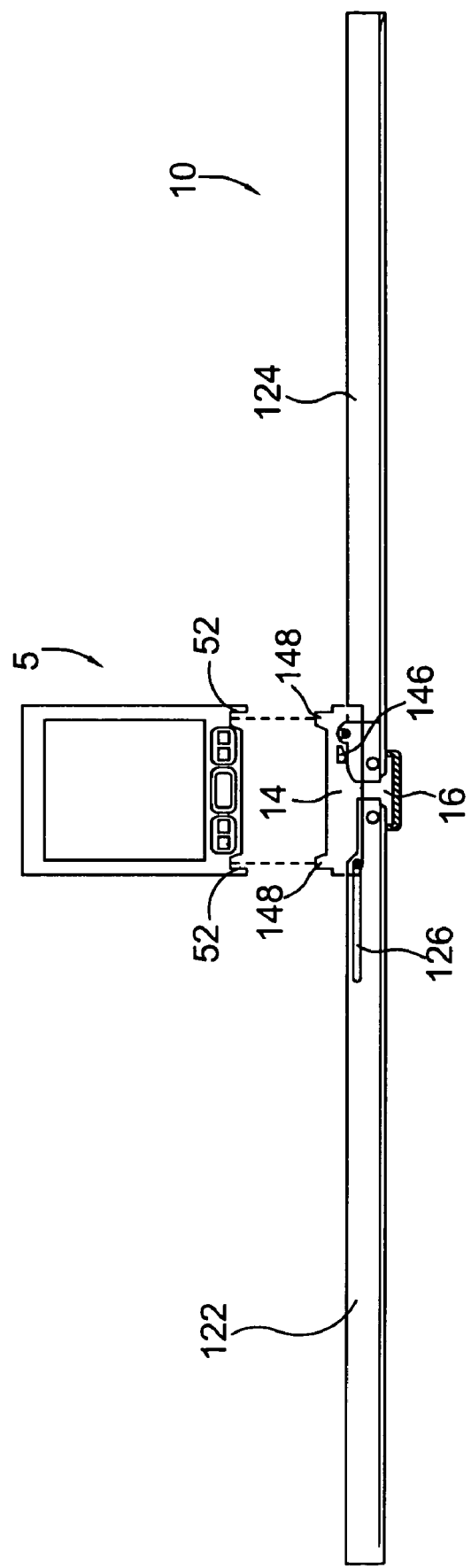

ELECTRONIC APPARATUS AND INPUT DEVICE WITH MOVABLE SUPPORT DEVICE

CROSS-REFERENCE TO RELATED APPLICATIONS

This application claims priority to Taiwan Patent Application No. 092208164 entitled "Electronic Apparatus and Input Device with Movable Support Structure", filed on May 5, 2003.

FIELD OF INVENTION

The present invention generally relates to an electronic apparatus and, more particularly, to an input apparatus with a movable support device.

BACKGROUND OF THE INVENTION

In order to promote portability and reduce required storage space, conventional portable electronic devices, such as Personal Digital Assistants (PDAs), are not generally equipped with conventional keyboards. As the demand for inputting large amount of data increases, external keyboards are one solution to problems of slow input speed and inconvenient data input. However, one issue with external keyboards relates to physically supporting the palm-size and lightweight PDA typically designed for hand-held use. When the PDA is put on a table, the PDA is not typically supported vertically, and the display angle may be difficult to adjust according to user's need. A support device for supporting the portable electronic device was therefore developed to integrate with the external keyboard.

Conventional support devices are generally affixed to the external keyboards, so that the portable electronic device can be supported in an appropriate position, such as the middle of the rear side of the keyboard, which is generally the position most suitable for user to operate the PDA and keyboard ergonomically. Though the affixed support device provides a favorable operation position, it hinders the reduction of keyboard size. For example, the affixed support device is not suitable for the application of foldable keyboard. Therefore, the conventional foldable keyboard is generally equipped with a support device affixed on one side of the keyboard sacrificing the convenience of operation. When the foldable keyboard is expanded for use, the support device is not in the most suitable operation position for users but on one side of the keyboard. Consequently, the user cannot operate the keyboard ergonomically resulting in the reduction of input speed.

Therefore, there is a need to provide an input apparatus with a movable support device so that the input apparatus can be minimized when not in use and also provide the support device for supporting an additional electronic device at a predetermined position when in operation.

SUMMARY OF THE INVENTION

One aspect of the present invention is to provide an electronic apparatus with a movable support device, which moves to a predetermined position to support and/or connect an additional electronic device.

Another aspect of the present invention is to provide a movable support device for supporting or connecting an electronic device, such as a personal digital assistant.

In a first embodiment, the present invention provides an electronic apparatus including a housing and a support device. The housing includes a first part and a second part. The first part of the housing is pivotally coupled to the second part, so that the housing is selectively in a first configuration and a second configuration. The support device has a first connection portion and a second connection portion. The first connection portion is slidably coupled to the first part of the housing, and the second connection portion is rotatably coupled to the second part of the housing. When the housing is in the first configuration, the support device is accommodated within the housing. When the housing transforms into the second configuration, in response to movements of the first part and the second part of the housing, the support device moves to a predetermined position for supporting an electronic device.

In another embodiment, the present invention provides an input device including a housing, two sets of keys and a support device. The housing includes a first part and a second part. The first part is pivotally coupled to the second part, so that the housing is selectively in a first configuration and a second figuration. Each of the two sets of keys are disposed on the first part and the second part of the housing respectively. The support device has a first connection portion and a second connection portion. The first connection of the support device is slidably coupled to the first part of the housing, and the second connection portion of the support device is rotatably coupled to the second part of the housing. When the housing is in the first configuration, the two sets of keys and the support device are accommodated within the housing. When the housing transforms into the second configuration, in response to movement of the firs part and the second part of the housing, the support device moves to a predetermined position, and the two sets of keys are substantially coplanar.

Furthermore, the support device includes a support portion and a connection body. The support portion is pivotally coupled to the connection body. When the housing is in a first configuration, the support portion partially covers the first part of the housing. When the housing is in the second configuration, the support portion pivotally rotates at an angle to support an electronic device. Moreover, the support device further includes an electrical connection part. When the housing is in the first configuration, the electrical connection part is accommodated within the housing. When the housing is in the second configuration, the electrical connection part is coupled to the electronic device.

The electronic apparatus or the input device described above can be selectively in a folded configuration to reduce the required storage space so as to increase the portability, or in an expanded configuration to promote comfort of use. When the electronic/input apparatus is expanded to be used, in response to movement of the housing, the support device moves to a predetermined position, such as a position that is equally disposed on two parts of the housing. When the support device supports other electronic devices, with the movable feature of the support device, a user can ergonomically operate the electronic apparatus or the input apparatus.

BRIEF DESCRIPTION OF THE DRAWINGS

The foregoing aspects and many of the attendant advantages of this invention will become more readily appreciated as the same becomes better understood with reference to the following detailed description, when taken in conjunction with the accompanying drawings, wherein:

FIGS. 2A, 2B, and 2C illustrate schematic views of the first embodiment in different configurations respectively;

DETAILED DESCRIPTION

The present invention provides an electronic apparatus with a movable support device. For example, the electronic apparatus can be an input device, which is selectively in a folded configuration to reduce the required storage space so as to increase the portability, or in an expanded configuration to promote comfort of use. When the input apparatus is expanded to be used, in response to movement of the housing, the support device moves to a predetermined position for supporting other electronic devices. With the movable feature of the support device, a user can ergonomically operate the input apparatus.

Figure 1:
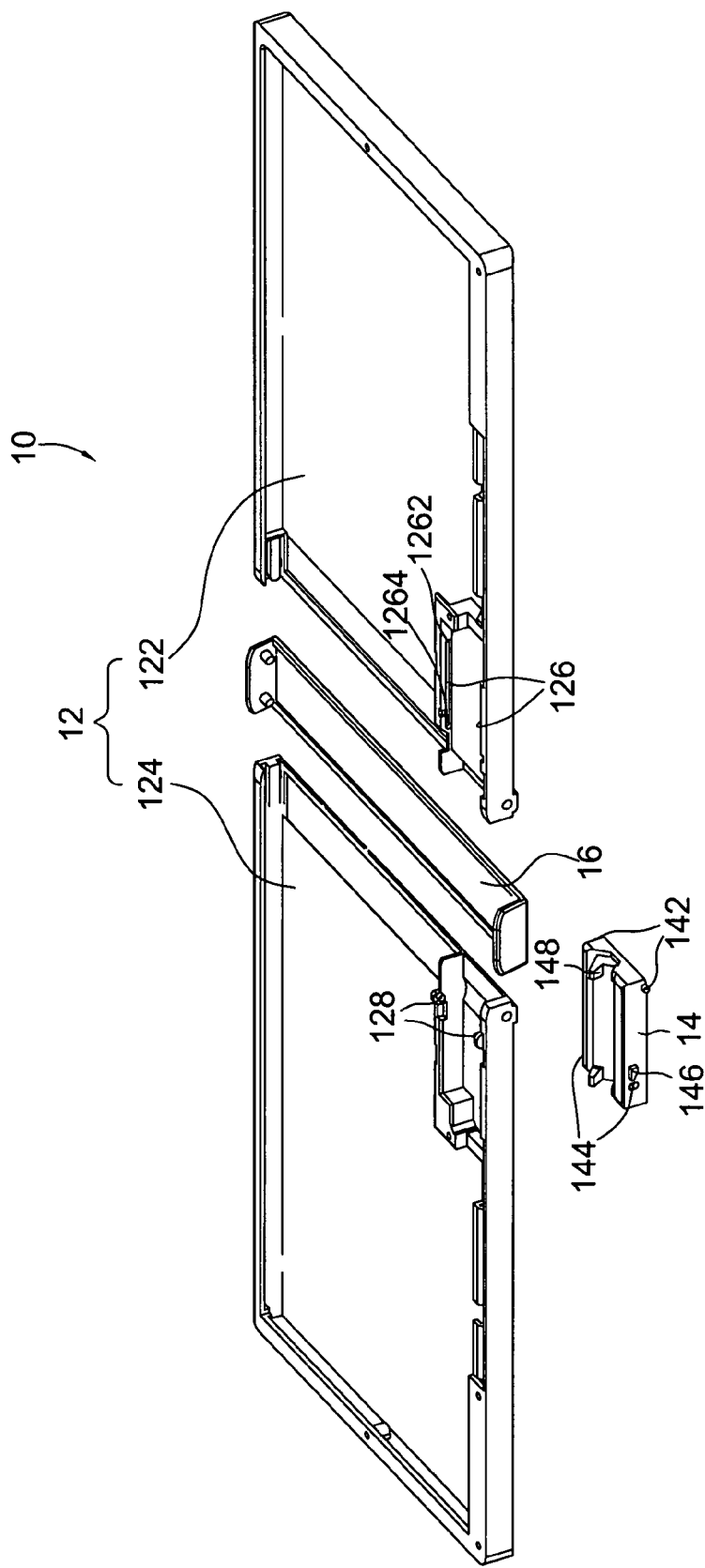
FIG. 1 illustrates an explosive view of a first embodiment of the present invention.

FIG. 1 illustrates an explosive view of a first embodiment of the present invention. The present invention provides an electronic apparatus 10 including a housing 12, a support device 14, and a connection device 16. The housing 12 includes a first part 122 and a second part 124. The first and second parts are rotatably coupled to the connection device 16. In such an arrangement, the first part 122 is rotatably coupled with respect to the second part 124 so that the housing 12 is selectively in a first configuration and a second configuration. For example, the first part 122 and the second part 124 are pivotally coupled to the connection device 16, so that the housing 12 is selectively in a folded configuration and an expanded configuration. The support device 14 includes a first connection portion 142 and a second connection portion 144. The first connection portion 142 is slidably coupled to the first part 122 of the housing 12, and the second connection portion 144 is rotatably coupled to the second part 124 of the housing 12.

As shown in FIG. 1, the first connection portion 142 of the support device 14 can be a protrusion, and the first part 122 of the housing 12 includes a groove 126 for accommodating the protrusion 142. For example, two protrusions 142 respectively disposed on two sides of the support device 14 correspond to two grooves 126 disposed on sidewalls of the first part 122 of the housing 12. Furthermore, the groove 126 has a first end 1262 and a second end 1264. The protrusion 142 is disposed in the groove 126, in response to configuration change of the housing 12, the protrusion 142 slides between the first end 1262 and the second end 1264 within the groove 126. Moreover, the second connection portion 142 of the support device 14 includes a hole, and the second part 124 of the housing 12 includes a protrusion 128. Therefore, the protrusion 128 is rotatably coupled to the hole 144. For example, two holes 144 disposed on two sides of the support device 14 correspond to two protrusions 128 disposed on sidewalls of the second part 124 of the housing 12.

Figure 2A:
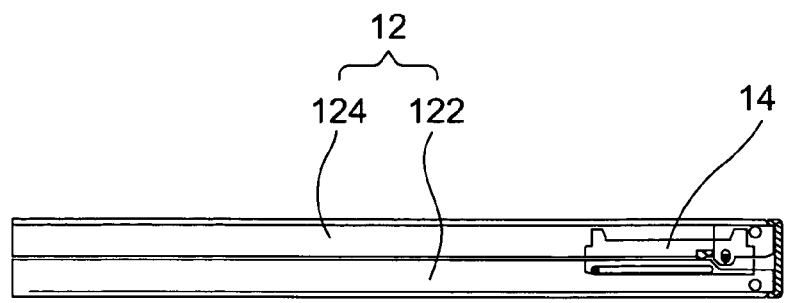
Figure 2B:
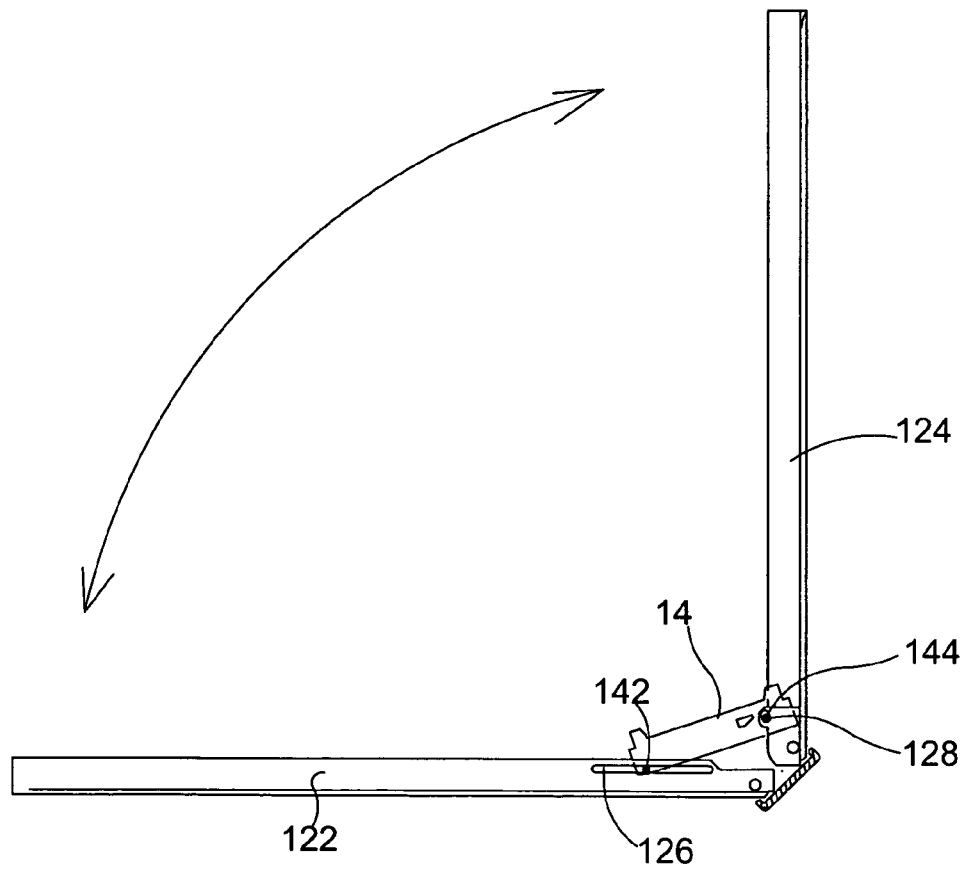

FIGS. 2A–2C illustrate side views of the electronic apparatus 10 in the first configuration, the transition configuration, and the second configuration respectively. As shown in FIG. 2A, when the housing 12 is in the first configuration, the support device 14 is accommodated within the housing 12. For example, as the housing 12 is in the folded configuration, the first part 122 and the second part 124 of the housing 12 are folded together to provide a space for accommodating the support device 14. The first connection portion 142 of the support device 14, such as the protrusion 142, is received in the first end 1262 of the groove 126. In other words, when the housing 12 is in the first configuration, the support device 14 is substantially disposed on the first part 122 of the housing 12.

As shown in FIG. 2B, as the housing 12 is in the transition configuration, in response to the movement of the first part 122 and the second part 124 of the housing 12, the support device 14 moves to a predetermined position. In other words, as the housing 12 is folded or expanded, a user can apply a force on the second part 124 of the housing 12, so that the first connection portion 142 of the support device 14 moves along the groove 126 in response to movement of the second part 124 of the housing 12, as the arrow illustrates.

As shown in FIG. 2C, when the housing 12 transforms into the second configuration, in response to the movement of the first part 122 and the second part 124 of the housing 12, the support device 14 moves to a predetermined position. For example, when the housing 12 transforms from the folded configuration into the expanded configuration, the protrusion 128 of the second part 124 of the housing 12 rotates with respect to the hole 144 of the support device 14. Therefore, the protrusion 142 of the support device 14 slides along the groove 126 of the first part 122 of the housing 12 and is received in the second end 1264 of the groove 126. In other words, when the housing 12 is in the expanded configuration, the first part 122 and the second part 124 are substantially on an identical plane, and the support device 14 is at the predetermined position. The predetermined position can be in the middle of one side of the housing 12. In other words, when the first part 122 and the second part 124 are expanded, the support device 14 moves to a position so that the support device 14 is equally disposed on the first part 122 and the second part 124 for supporting an electronic device 5, such as an personal digital assistant.

As shown in FIGS. 1 and 2C, the support device 14 further includes a stopper 146 and a third connection portion 148. The stopper 146, such as a raised block, is disposed on the side of the support device 14. When the housing 12 is in the second configuration (expanded), the stopper 146 touches against the second part 124 of the housing 12 to prohibit the support device 14 from vertically moving along the hole 144. Therefore, when the housing 12 is expanded, the support device 14 not only moves to the appropriate position for supporting the electronic device, but also with the feature of stopper 146 is closely against the housing 12 to prevent swaying. Moreover, as shown in FIG. 2C, the electronic device 5 has a connection portion 52, such as a hole, corresponding to the third connection portion 148 of the support device 14, such as protrusion 148. When the housing 12 is expanded, the protrusion 148 of the support device 14 is engaged with the hole 52 to enhance the connection between the electronic apparatus 10, such as a foldable input apparatus, and the electronic device 5, such as a PDA.

Figure 3:
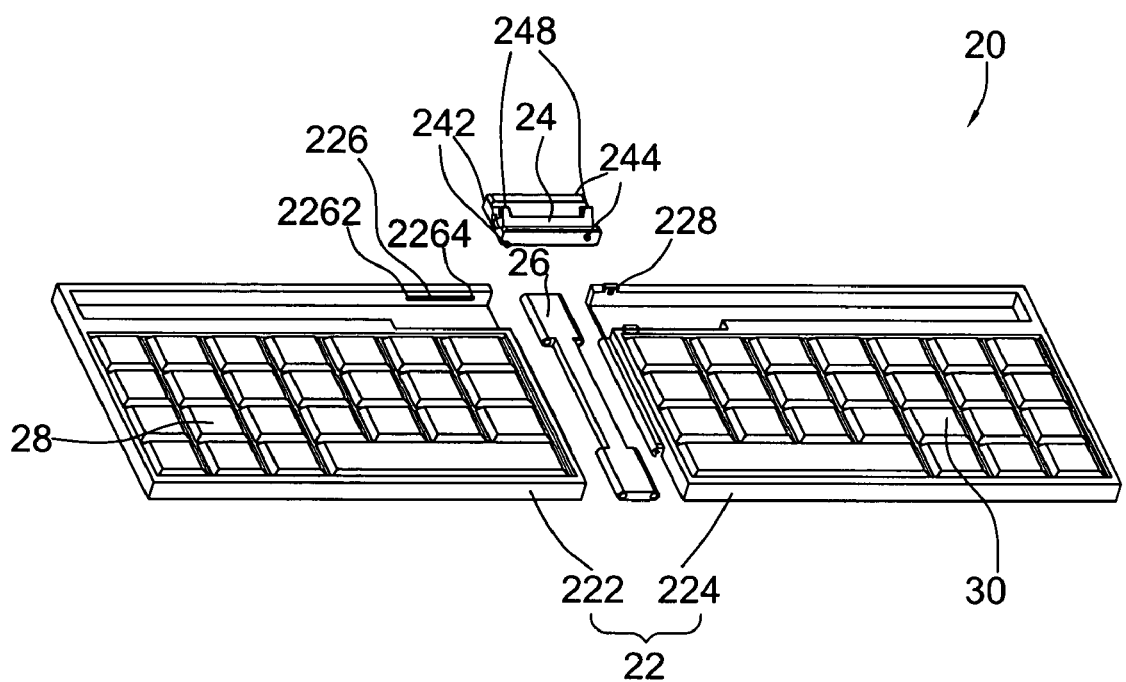
FIG. 3 illustrates an explosive view of a second embodiment of the present invention.

Referring to FIG. 3, in a second embodiment, the present invention provides an input apparatus 20, which employs similar features of the first embodiment. The input apparatus 20 includes a housing 22, a support device 24, a connection device 26, a first set of keys 28 and a second set of keys 30. The housing 22 includes a first part 222 and a second part 224. The first part 222 and the second part 224 are rotatably coupled to the connection device, so that the housing 22 is selectively in a first configuration and a second configuration. In this embodiment, the first and second parts 222, 224 of the housing 12 are independently rotatably coupled to the connection device 26 so that the input device 20 can be in a folded or an expanded configuration. Two sets of keys 28, 30 are disposed on the first part 222 and the second part 224 of the housing 22 respectively. Therefore, the input apparatus 20 functions as a foldable keyboard.

As shown in FIG. 3, the support device 24 includes a first connection portion 242 and a second connection portion 244. The first connection portion 242 of the support device 24 can be a protrusion, and the first part 222 of the housing 22 includes a groove 226 for accommodating the protrusion 242. Similarly, the groove 226 has a first end 2262 and a second end 2264. Therefore, the protrusion 242 is slidably coupled to the groove 226 of the first part 222 of the housing 22. In response to configuration change of the housing 22, the protrusion 242 selectively slides between the first end 2262 and the second end 2264 within the groove 226. Different from the first embodiment, the second connection portion 244 of the support device 24 can be a protrusion, and the second part 224 of the housing 22 includes a hole 228 corresponding to the second connection portion 242. Therefore, the protrusion 244 is rotatably coupled to the hole 228.

Figure 4A:
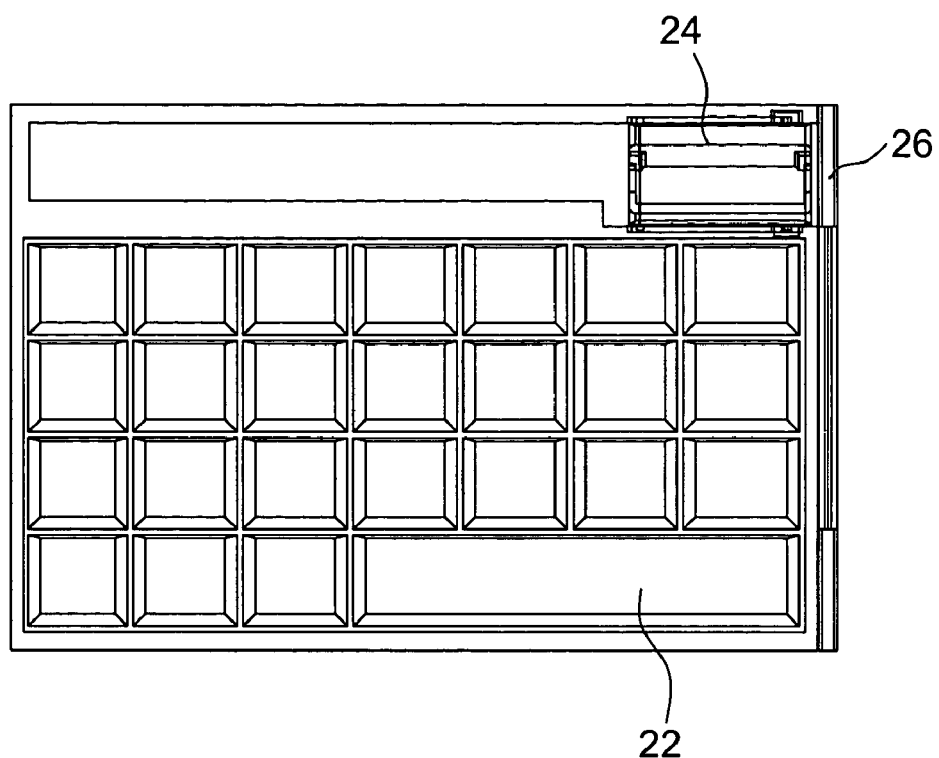
FIGS. 4A and 4B illustrate a top view and a side view of the second embodiment in a first configuration respectively.
Figure 4B:
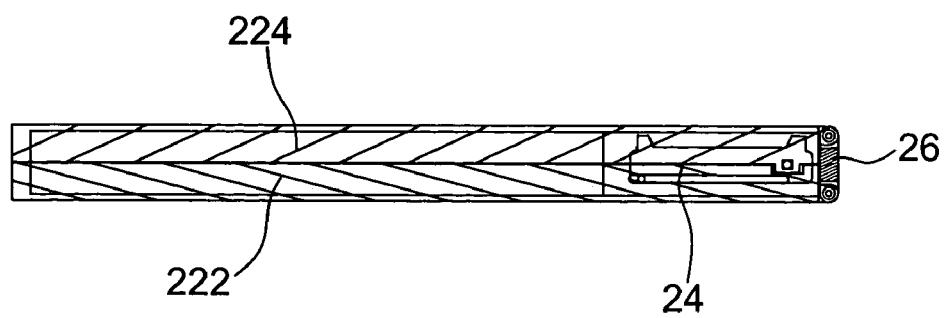

As shown in FIGS. 4A and 4B, a top view and a side view of the input apparatus 20 in the first configuration are illustrated respectively. When the housing 22 is in the first configuration, the support device 24 is accommodated within the housing 22. In other words, when the input apparatus 20, such as a foldable keyboard, is folded, the first part 222 and the second part 224 are folded together to provide a space for accommodating the support device 24. For example, as the input apparatus 20 is in the folded configuration, the support device 24 is substantially on the first part 222 of the housing 22, and therefore, the input device 20 with a smaller volume occupies less space so as to increase the portability. Furthermore, the housing 22 can provide the sets of keys 28, 23 and the support device 24 with protection.

Figure 5:
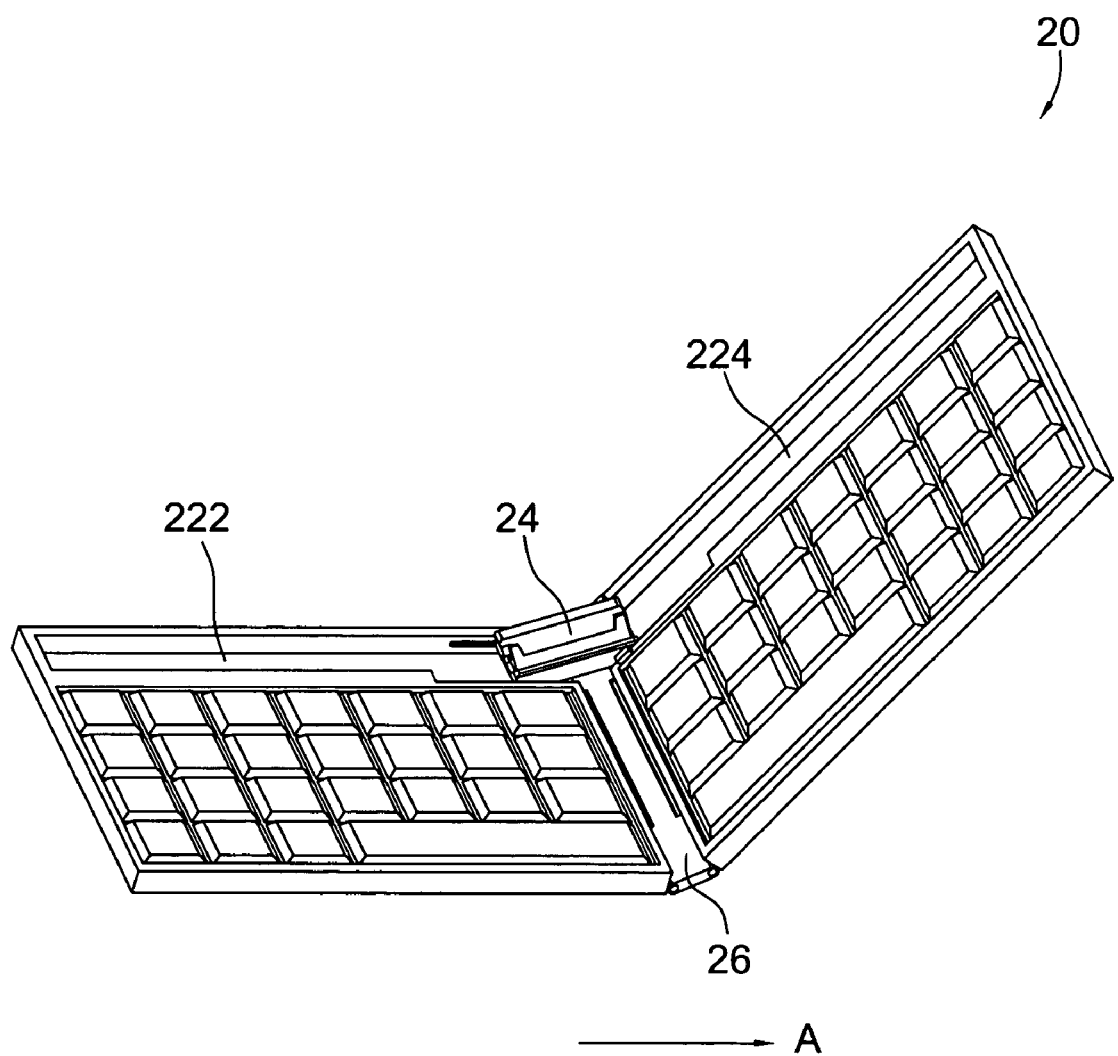
FIG. 5 illustrates a schematic view of the second embodiment in a transition configuration.

FIG. 5 illustrates a three-dimensional view of the transition configuration as the input device 20 transforms from the first configuration into the second configuration. Because the first and second parts of the housing 22 are rotatable with respect to the connection device 26, the input apparatus 20 can be expanded from the second part 224. Therefore, in response to the movement of the first part 222 and the second part 224 of the housing 22, the support device 24 moves to a predetermined direction, as the arrow "A" illustrates.

Figure 6A:
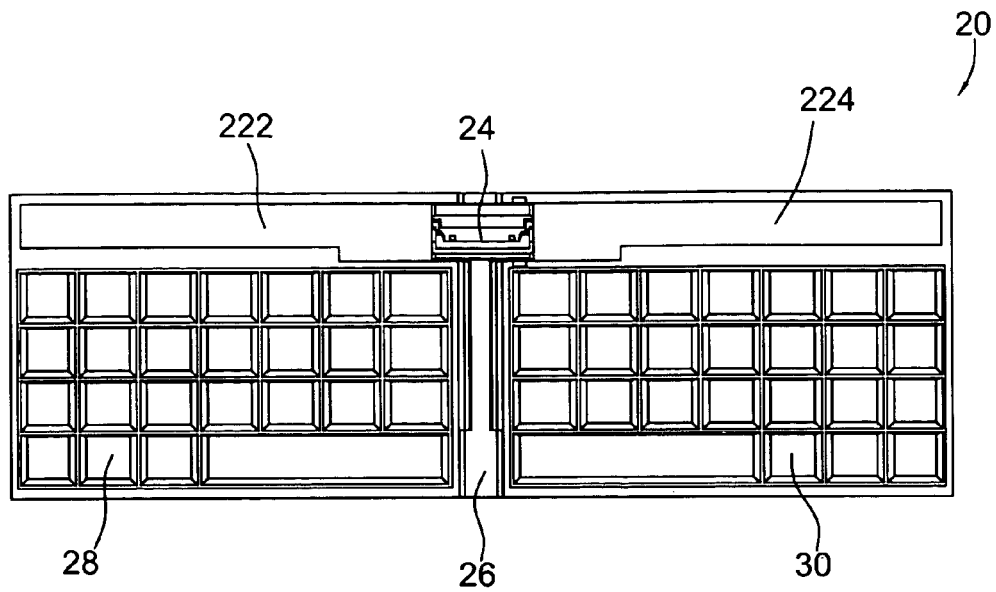
FIGS. 6A, 6B, and 6C illustrate the top view, side view, and three-dimensional view of the second embodiment in a second configuration respectively.
Figure 6B:
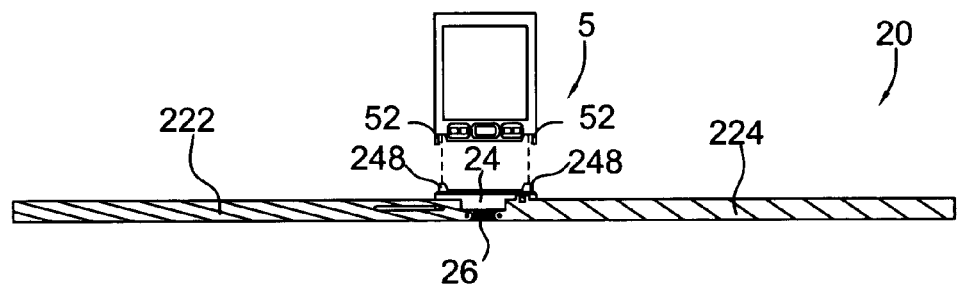
Figure 6C:
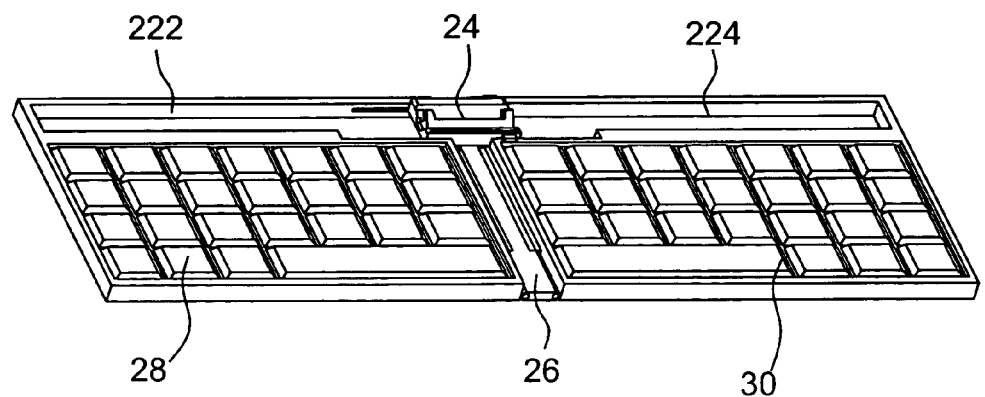

FIGS. 6A, 6B, and 6C illustrate a top view, a side view, and a 3-D view of the input apparatus 20 in the second configuration. When the input apparatus 20 is in the second configuration, the first part 222 and the second part 224 of the housing 22 are substantially on an identical plane. In this configuration, the input apparatus 20 is expanded to a maximum operating area so as to promote the convenience of operation. Moreover, due to the movable feature, the support device 24 can move to an appropriate position, such as in the middle of rear side of the input apparatus 20, and is configured to support an electronic device 5, such as a PDA. As the PDA is supported by the support device 24 on the middle of rear side of the input apparatus 20, the user can operate the keys with two hands balancedly and ergonomically. The support device 24 can further includes a third connection portion 248, such as a protrusion, which functions as the third connection portion 148 illustrated in the first embodiment. As shown in FIG. 6B, the electronic device 5 has a connection portion 52, such as a hole, corresponding to the third connection portion 248 of the support device 24. When the input apparatus 20 is expanded, the protrusion 248 of the support device 24 is engaged with the hole 52 to enhance the connection between the input apparatus 20 and the electronic device 5, such as a PDA.

It is noted that though drawings for the first and the second embodiments described above lack illustrations of showing the electrical connection between the electronic apparatus 10 (or the input apparatus 20) and the electronic device 5, persons skilled in the art shall recognize that practical wire or signal connections or wireless connections can be implemented in the present invention. In other words, the support device 14 or 24 can further include an electrical connection part for electrically coupling to the supported electronic device 5. The signal or data transmission is not limited to electrical connections. When the support device 14 or 24 is not provided with an electrical wire connection to the electronic device 5, the electronic apparatus 10 or the input apparatus 20 can transmit data through a radio frequency transmitter or an infrared rays transmitter.

Figure 7A:
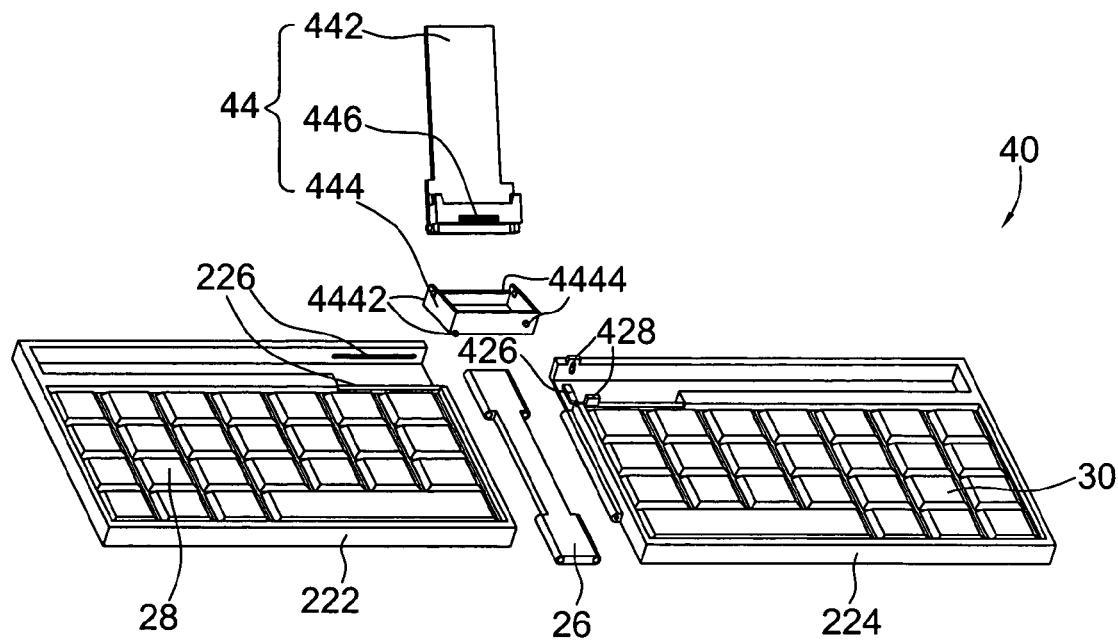
FIGS. 7A and 7B illustrate an explosive view and a partially enlarged view of a third embodiment of the present invention.
Figure 7B:
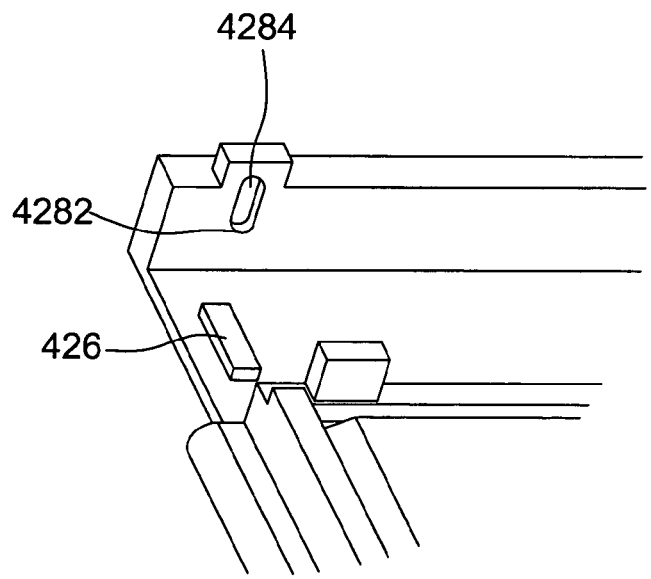

Referring to FIGS. 7A and 7B, a modified input apparatus 40 of the second embodiment is illustrated. Different from the second embodiment, in the input apparatus 40, the support device 44 is rotatably movably coupled to the second part 224 of the housing 22. The support device 44 further includes a support portion 442 and a connection body 444. The difference between the input apparatus 40 and the second embodiment is described hereinafter.

As shown in FIG. 7B, the second part 224 of the housing 22 includes a slot 418 instead of a hole. The slot 428 has a first end 4282 and a second end 4284. The first and second connection portions (such as protrusions 4442 and 4444) of the support device 44 are disposed on the connection body 444. The protrusion 4442 is slidably coupled to the groove 226 of the first part 222 of the housing 22, and the protrusion 4444 is rotatably movably coupled to the slot 428. In such an arrangement, when the input apparatus 40 is in the first configuration (folded), the protrusion 4444 is received in first end 4282 of the slot 428. When the input apparatus 40 transforms into the second configuration (expanded), the protrusion 4444 rotatably moves within the slot 428 and is received in the first end 4282. Furthermore, the input apparatus 40 includes a stopper 426 disposed on the second part 224 of the housing 22. When the input apparatus 40 is in the second configuration, the stopper 426 touches against the support device 44 so that the protrusion 4444 of the support device 44 is received in the second end 4284 of the slot 428. In other words, when the first and second parts are folded together, the support device 44 is accommodated within the housing 22 due to movement of the connection portions with respect to the first and second parts. When the first and second parts of the housing 22 are on an identical plane (i.e. expanded configuration), the second connection portion 4444 rotatably moves within the slot 428 and elevatedly received in the second end 4284 of the slot 428. The stopper 426 touches against the connection body 444 so as to maintain horizontal balance of the support device 24. The implement of the slot 428 and the stopper 426 can prevent the interference between the connection body 444 and the second part 224 when the accommodation space (or size) of the input apparatus is continuing to shrink.

Figure 8A:
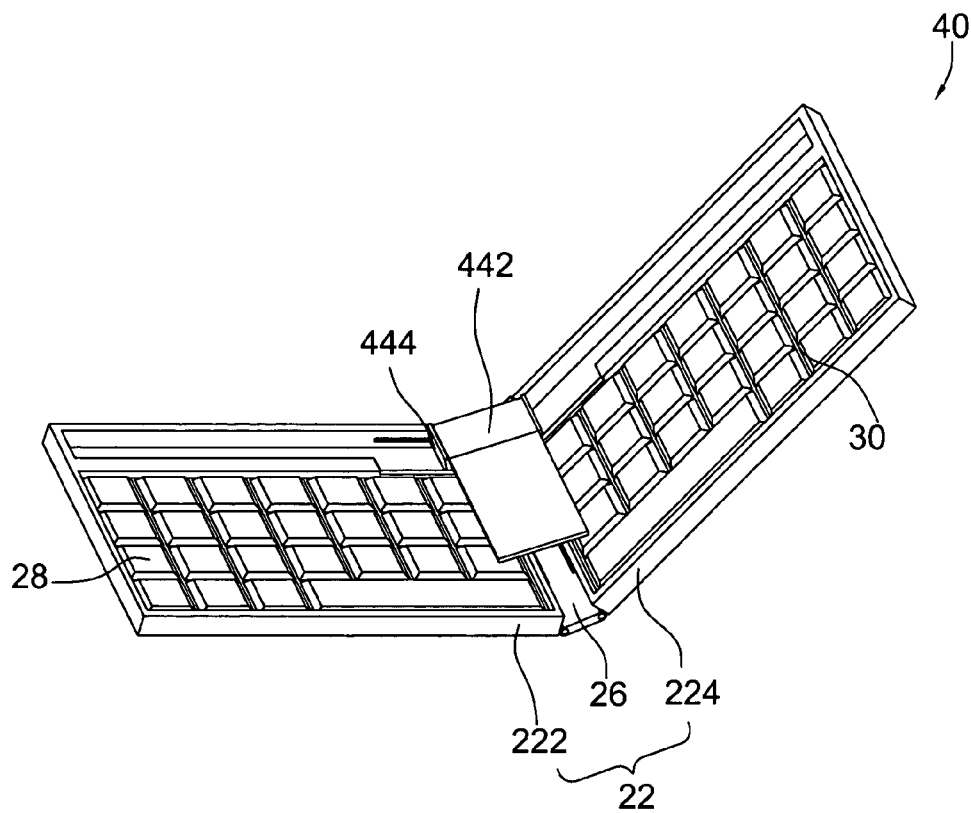
FIGS. 8A, 8B, and 8C illustrate schematic views of the third embodiment in different configurations respectively.
Figure 8B:
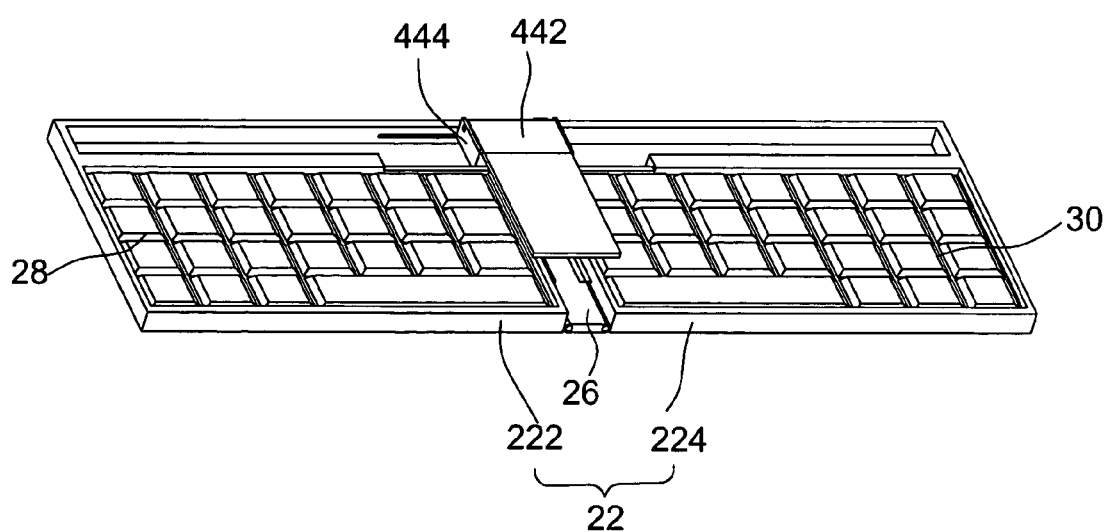
Figure 8C:
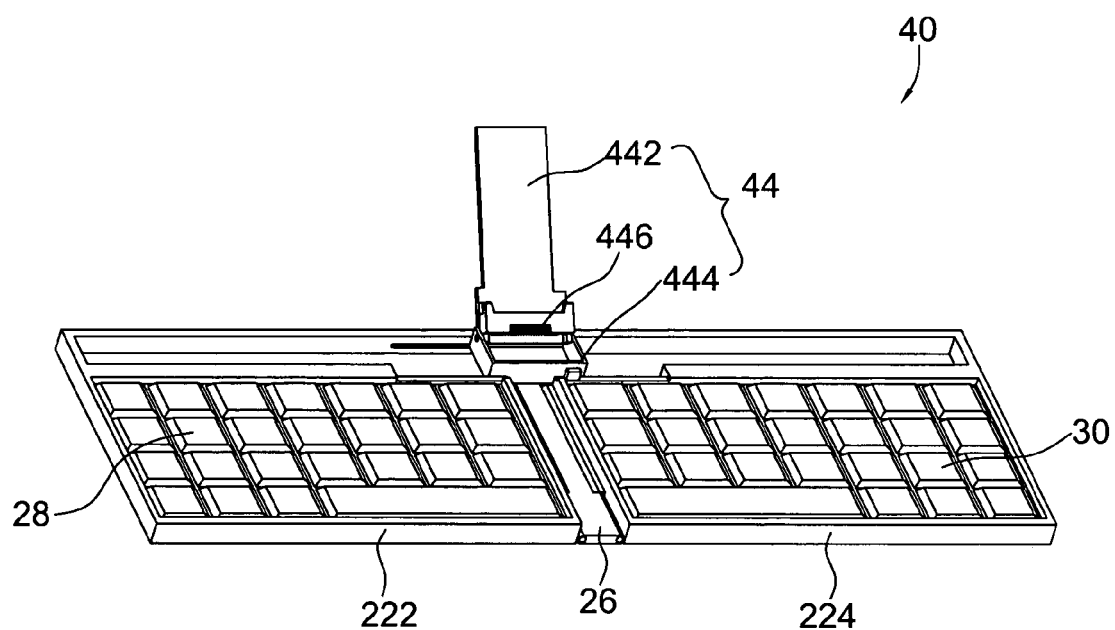

Moreover, the support portion 442 of the support device 44 is pivotally coupled to the connection body 444. When the housing 22 is in the first configuration, the support portion 442 partially covers the first part 222 of the housing 22. When the housing 22 is in the second configuration, the support portion 442 rotates at an angle 442 to support an electronic device. Referring to FIGS. 8A, 8B, and 8C, different configurations of the housing with respect to the support portion 442 are illustrated. As shown in FIG. 8A, when the housing 22 transforms from the first configuration (folded) into the second configuration (expanded), as well as the connection body 444, the support portion 442 moves to a predetermined position. Referring to FIG. 8B, when the connection body 444 is at the predetermined position (such as the position equally disposed on the first and second parts of the housing, or any place as appropriate), the support portion 442 and the connection body 444 maintain as folded. By applying a force on the support portion 442, the support portion 442 rotates at an angle to support the electronic device, such as a PDA, as shown in FIG. 8C. With respect to the connection body 444, the support portion 442 is equally disposed on the first part 222 and the second part 224 of the housing 22. With the feature of the support portion 442, the support of the electronic device is enhanced when the input apparatus is used with the electronic device. When the input apparatus is not in use, the input apparatus is minimized to increase the portability. It is noted that the shape, and size of the support portion 442 are designed with respect to the housing.

Additionally, referring to FIGS. 7A and 8C, the support device 44 includes an electrical connection part 446. When the housing 22 is in the first configuration, the electrical connection part 446 is accommodated within the housing. When the housing 22 is in the second configuration, the electrical connection part 446 is electrically coupled to the supported electronic device. Therefore, the input apparatus 40 can use the movable support device 44 to support the electronic device at an appropriate position and also use the electrical connection part 446 provided by the support device 44 to achieve the electrical connection between the input apparatus 40 and the electronic device.

Although specific embodiments have been illustrated and described, it will be obvious to those skilled in the art that various modifications may be made without departing from what is intended to be limited solely by the appended claims.

What is claimed is:

1. An electronic apparatus, comprising:
   a housing comprising a first part and a second part, said first part pivotally coupled to said second part so that said housing is selectively in a first configuration and a second configuration; and
   a support device having a first connection portion and a second connection portion, said first connection portion of said support device slidably coupled to said first part of said housing, said second connection portion of said support device rotatably coupled to said second part of said housing;
   wherein said support device is accommodated within said housing when said housing is in said first configuration, and in response to movement of said first and second parts of said housing, said support device moves to a predetermined position for supporting an electronic device when said housing transforms into said second configuration.

2. The electronic apparatus of claim 1, wherein said first part and said second part of said housing are folded together to provide a space for accommodating said support device when said housing is in said first configuration.

3. The electronic apparatus of claim 2, wherein said support device is substantially disposed on said first part of said housing when said housing is in said first configuration.

4. The electronic apparatus of claim 1, wherein said first and second parts of said housing are substantially disposed on an identical plane when said housing is in said second configuration.

5. The electronic apparatus of claim 4, wherein said support device is equally disposed on said first and second parts of said housing for supporting said electronic device.

6. The electronic apparatus of claim 1, wherein said first connection portion of said support device comprises a first protrusion, and said first part of said housing has a groove for accommodating said first protrusion.

7. The electronic apparatus of claim 6, wherein said groove has a first end and a second end, said first protrusion is received in said first end of said groove when said housing is in said first configuration, and said first protrusion slides along said groove and is received in said second end of said groove when said housing transforms into said second configuration.

8. The electronic apparatus of claim 6, wherein said second connection portion of said support device comprises a second protrusion, said second part of said housing has a slot, and said second protrusion is rotatably and movably coupled to said slot.

9. The electronic apparatus of claim 8, wherein said slot has a first end and a second end, said second protrusion is received in said first end of said slot when said housing is in said first configuration, and said second protrusion rotatably moves along said slot and is received in said second end of said slot when said housing transforms into said second configuration.

10. The electronic apparatus of claim 9, further comprising a stopper disposed on said second part of said housing, said stopper touches against said support device to elevate said support device so that said second protrusion is received in said second end of said slot when said housing is in said second configuration.

11. The electronic apparatus of claim 6, wherein said second connection portion of said support device comprises a second protrusion, and said second part of said housing has a hole, and wherein said second protrusion rotatably engages with said hole.

12. The electronic apparatus of claim 6, wherein said second connection portion of said support device comprises a hole, and said second part of said housing has a protrusion, and wherein said protrusion rotatably engages with said hole.

13. The electronic apparatus of claim 12, wherein said support device further comprises a stopper for touching against said second part of said housing to prohibit said support device from vertically moving along said hole when said housing is in said second configuration.

14. The electronic apparatus of claim 1, wherein said support device further comprises a third connection portion, said electronic device has a corresponding connection portion, and wherein said third connection portion of said support device engages with said corresponding connection portion of said electronic device when said housing is in said second configuration.

15. The electronic apparatus of claim 14, wherein said third connection portion comprises a protrusion, and said corresponding connection portion of said electronic device comprises a hole, and wherein said protrusion engages with said hole when said housing is in said second configuration.

16. The electronic apparatus of claim 1, wherein said support device further comprises a support portion and a connection body, said support portion pivotally coupled to said connection body, wherein said support portion partially covers said first part of said housing when said housing is in said first configuration, and wherein said support portion is substantially equally disposed on said first and second parts of said housing and pivotally rotates at an angle to support said electronic device when said housing is in said second configuration.

17. The electronic apparatus of claim 1, wherein said support device further comprises an electrical connection part, said electrical connection part is accommodated within said housing when said housing is in said first configuration, and wherein said electrical connection part is electrically coupled to said electronic device when said housing is in said second configuration.

18. The electronic apparatus of claim 1, wherein said electronic apparatus comprises an input apparatus having two sets of keys disposed on said first part and said second part of said housing respectively.

19. The electronic apparatus of claim 18, wherein said two sets of keys are accommodated within said housing when said housing is in said first configuration, and said two sets of keys are substantially coplanar when said housing is in said second configuration.

* * * * *